US007050496B2

(12) United States Patent
Oh et al.

(10) Patent No.: US 7,050,496 B2
(45) Date of Patent: May 23, 2006

(54) MULTI-CHANNEL IMAGE ENCODING METHOD AND SYSTEM

(75) Inventors: Taek Man Oh, Seoul (KR); Ghee Mahn Hahn, Seoul (KR)

(73) Assignee: 4NSYS Co., Ltd., Incheon (KR)

( * ) Notice: Subject to any disclaimer, the term of this patent is extended or adjusted under 35 U.S.C. 154(b) by 710 days.

(21) Appl. No.: 10/203,822

(22) PCT Filed: Feb. 15, 2001

(86) PCT No.: PCT/KR01/00228

§ 371 (c)(1),
(2), (4) Date: Aug. 14, 2002

(87) PCT Pub. No.: WO01/61999

PCT Pub. Date: Aug. 23, 2001

(65) Prior Publication Data

US 2003/0048853 A1 Mar. 13, 2003

(30) Foreign Application Priority Data

Feb. 15, 2000 (KR) ................................. 2000-6979
Feb. 15, 2000 (KR) ................................. 2000-6982

(51) Int. Cl.
*H04N 7/12* (2006.01)
(52) U.S. Cl. ................................ 375/240.1; 375/240.28
(58) Field of Classification Search ............. 375/240.1, 375/240.25, 240.26, 240.28; 348/423.1, 348/388.1
See application file for complete search history.

(56) References Cited

U.S. PATENT DOCUMENTS 5,500,676 A * 3/1996 Tanaka et al. ........... 348/386.1
5,506,844 A * 4/1996 Rao ........................... 370/468
5,509,017 A * 4/1996 Brandenburg et al. ...... 370/477
5,659,353 A * 8/1997 Kostreski et al. ............. 348/21
5,793,425 A * 8/1998 Balakrishnan ......... 375/240.25
5,862,140 A * 1/1999 Shen et al. .................. 370/468
6,259,733 B1 * 7/2001 Kaye et al. ................. 375/240
6,567,117 B1 * 5/2003 Nago et al. ................. 348/180
2001/0009568 A1 * 7/2001 Haneda ................. 375/240.25
2001/0014121 A1 * 8/2001 Kaye et al. ............. 375/240.03

FOREIGN PATENT DOCUMENTS

JP 8-307824 11/1996
WO WO 99/38333 7/1999

OTHER PUBLICATIONS

Wang et al, "Joint Rate Control For Multi-Program Video Coding", IEEE Transactions on Consumer Electronics, vol. 42, No. 3, pp. 300-305, Aug. 1996.*

* cited by examiner

*Primary Examiner*—Vu Le
(74) *Attorney, Agent, or Firm*—Sughrue Mion, PLLC (57) ABSTRACT

A method and apparatus for encoding multi-channel video signals is disclosed. In order for multiple of input channels to share hardware resources, one input channel is selected and multi-channel input video signals are stored through memory block switching. Multiplexer (1), video decoder (3), and digital video multiplexer (9) participate in selecting one input channel and memory block switching section (17) switches input and restoring frames to and/or from memory (27). For stabilizing frame rate under the conditions of multiple input channels, input channel sequence is determined by synchronization signal separator (7) and priority detection and channel switching section (13). In accordance with the present invention, multi-channel video signals are encoded into MPEG by using the conventional single channel MPEG encoder (15).

5 Claims, 10 Drawing Sheets

MULTI-CHANNEL IMAGE ENCODING METHOD AND SYSTEM

TECHNICAL FIELD

The present invention relates to encoding systems and, more particularly, to a method and apparatus for encoding a plurality of input signals with a minimal hardware requirements.

BACKGROUND ART

The basic principle of the MPEG coding, now widely used for compressing full-motion video data, is removing redundancies between signals. Examples of redundancies between signals are spectral redundancy, temporal redundancy, spatial redundancy and statistical redundancy. Spectral redundancy is found between spectral elements of RGB (Red, Green, Blue) image signals received from an input device such as cameras. Temporal redundancy means redundancy between images adjacent in time and can be removed by estimating and compensating any changes between two consecutive images. Spatial redundancy exists between adjacent pixels. Statistical redundancy is to be represented by statistical relation among coefficients generated during the MPEG encoding process. Statistical relation is taken advantage of for removing the statistical redundancy.

The MPEG encoding generates three different kinds of frames, i.e., I, P and B frames, according to a compression method. I-frame, representing an intraframe coding, is generated by encoding all macro blocks within a picture. The picture, therefore, would still contain temporal redundancy. It is periodically generated to prevent error propagation and correct errors in changing pictures. P-frame, representing a predictive coding frame, is generated by removing temporal redundancy between a current frame and its previous I or P-frame. B-frame, representing a bi-directional predictive coding frame, is generated by removing temporal redundancy between a current frame and its previous and/or future frame. Backward, forward, and bi-directional predictive coding frames are respectively generated by estimating the movement of a current frame based upon a previous I or P-frame and/or future I or P-frame; and the best one of these three frames is selected as a B-frame.

The above MPEG encoding system has broadened its application in various fields, such as in digital monitoring systems, video teleconference systems, multi-channel remote mechanization systems and remote supervisory systems. These kinds of applications generally have multiple input signal sources. For example, a remote monitoring system in a bank receives video signals from cameras installed at various locations such as at the doors, teller windows, ATMS and vault.

Since conventional MPEG encoders have been designed for encoding a single channel video signal, they can not effectively compress a plurality of signals in an multi-channel environments. For instance, a conventional single-channel MPEG encoder may-remove spatial redundancy of multi-channel video signals. However, it can not effectively remove temporal redundancy because a large memory is needed in order to store previous frames (hereinafter, restoring frames) and current frames (hereinafter, input frames) for each of input channels.

Alternatively many single-channel MPEG encoders equal to the number of input channels could be proposed. And yet this scheme increases the system cost and results in an inefficient system.

To reduce hardware requirement, the input channels need to share hardware resources, such as memory and MPEG encoder. Particularly, since most of multi-channel MPEG encoding systems do not operate in real time the sharing of hardware resources is all the more desired.

However, designing an MPEG multi-channel encoder that uses common hardware such as memories has been found difficult because it experienced fluctuation in the frame rate during the course of MPEG encoding.

The frame rate of MPEG encoding depends upon synchronization signals that video signal sources generate. In an image encoding system where input video signals are encoded into a single stream of digital signals, like the aforementioned multi-channel encoding systems, the synchronization signals of the digital signals have the same phases as those of the analog synchronization signals generated by the video signal sources. However, the periods of the synchronization signals are not identical. For example, security cameras made by a same manufacture would not produce exactly the same synchronization signals. Also, the phase of a synchronization signal changes as time goes by. These variations cause frame rate fluctuation. Moreover, an increasing number of input channels would entail greater phase difference among input channels, thereby frame rate fluctuation Because the problem of frame rate fluctuation was not solved, a multi-channel MPEG encoding system has not been developed. Therefore, under the multi-channel environments, an encoder is needed that is able to encode signals at a stabilized frame rate regardless of the number of input channels and of the elapse of time.

DISCLOSURE OF THE INVENTION

Therefore, it is the object of the present invention to resolve the problems of the prior arts, that is, to supply multi-channel image encoding system where the multi-channel input video signals share hardware by switching multi-channel video signals and restoring and input frames.

To this goal, a multi-channel encoding system, in accordance with present invention, for encoding video signals from a plurality of input channels, each video signal being composed of a multiple of image data frames, comprising a means for selecting one channel from said plurality of input channels; and a means for storing image data frames, comprising a first set of at least two memory blocks for storing input image frames and a second set of memory blocks for storing restoring image frames, the number of memory blocks in the second set being one more than the number of said input channels, wherein said first set of memory blocks alternately store successively-received input image frames such that at least one non-storing memory block can be read and said second set of memory blocks alternately store successively-received restoring image frames such that at least one non-storing memory block can be read.

Another object of the present invention is to supply multi-channel image encoding system that stabilize frame rate under the conditions that the multi-channel input video signals are sharing hardware resources.

To this goal, a multi-channel image encoding system, in accordance with another feature of the present invention, for encoding multi-channel video signals, comprising: a means for separating synchronization signals from the multi-channel video signals; a means for determining priorities of the multi-channels of said vide signals on the basis of the phase relationship among the synchronization signals; a means for rearranging the multi-channel video signals in the order of the priorities determined by said priority determining means; and a means for encoding the rearranged video signals one by one.

Several variations of vaporization apparatus are also disclosed.

All objects, features, and advantages of the present invention will become apparent in the following detailed written description after a brief description of the drawings.

BRIEF DESCRIPTIONS OF THE DRAWINGS

The present invention itself, as well as preferred modes and advantages thereof, will best be understood by reference to the following detailed description of illustrative embodiments when read in conjunction with the accompanying drawings, wherein.

MODES OF CARRYING OUT THE INVENTION

Figure 1:
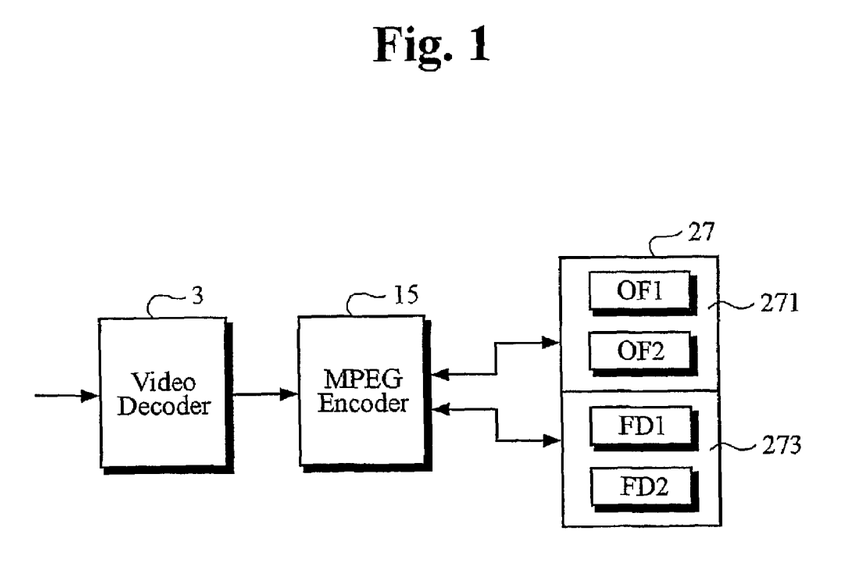
FIG. 1 is a block diagram of a conventional single channel MPEG encoding system.

FIG. 1 shows a conventional single-channel MPEG encoding system. A video decoder 3 transforms analog or digital input video signals into digital signals in a format that an MPEG encoder 15 can interpret. The MPEG encoder encodes digital video signals into MPEG signals. During the MPEG encoding process, current and previous frames of digital video signals are stored in a memory 27 for the purpose of eliminating temporal redundancy. Here, a frame is defined as a video image that is normally displayed on the display device at one instant of time. Memory 27 actually is comprised of an input frame memory 271 for storing a current frame and a restoring frame memory 273 for storing the previous frame.

The input frame memory comprises at least two memory blocks while the number of memory blocks in the restoring frame memory is at least one more than the number of input channels. The memory capacity of each block should be large enough to store the data of one video frame because, while a current frame is being stored, the previous frame is read out for encoding. Suppose that four input frames, F1, F2, F3, and F4, are sequentially input to a multi-channel MPEG encoding system according to the present invention.

First, frame F1 is written in a first block OF1 of the input frame memory. When frame F2 is input, it is written in a second block OF2 while frame F1 stored in the first block, is read and MPEG encoded to become frame I1. Next, frame F1 is copied into a first block FD1 of the restoring frame memory. Frame F1 now stored in the restoring frame memory would later be used when frame F2 is encoded. When frame F3 is subsequently received, it is overwritten in the first memory block OF1 where frame F1 had been stored and, at the same time, frame F2 stored in the second memory block OF2 and frame F1 stored in the memory block FD1 are read and used to MPEG encode frame F2 into frame P2. Frame F2 is then written in the restoring memory block FD2. When frame F4 is received, it is stored in input memory block OF2 where F2 frame was stored. At the same time, frame F3 stored in input memory block OF2 and regenerated frame F2 stored in restoring memory block FD2 are read to produce frame P3. Then, frame P3 and frame F2 are used to regenerate frame F3, which is later stored in the restoring memory block FD1 where regenerated frame F1 was stored. Repeating the above steps using the input and restoring frame memories, MPEG encoding is performed.

As mentioned before, in order to use an conventional MPEG encoding system, as described above, in a multi-channel environment without much modification, a selecting means for selecting one of multi-channel input video signals and a switching means for writing frame of the input frame memory to the restoring frames are needed.

Figure 2A:
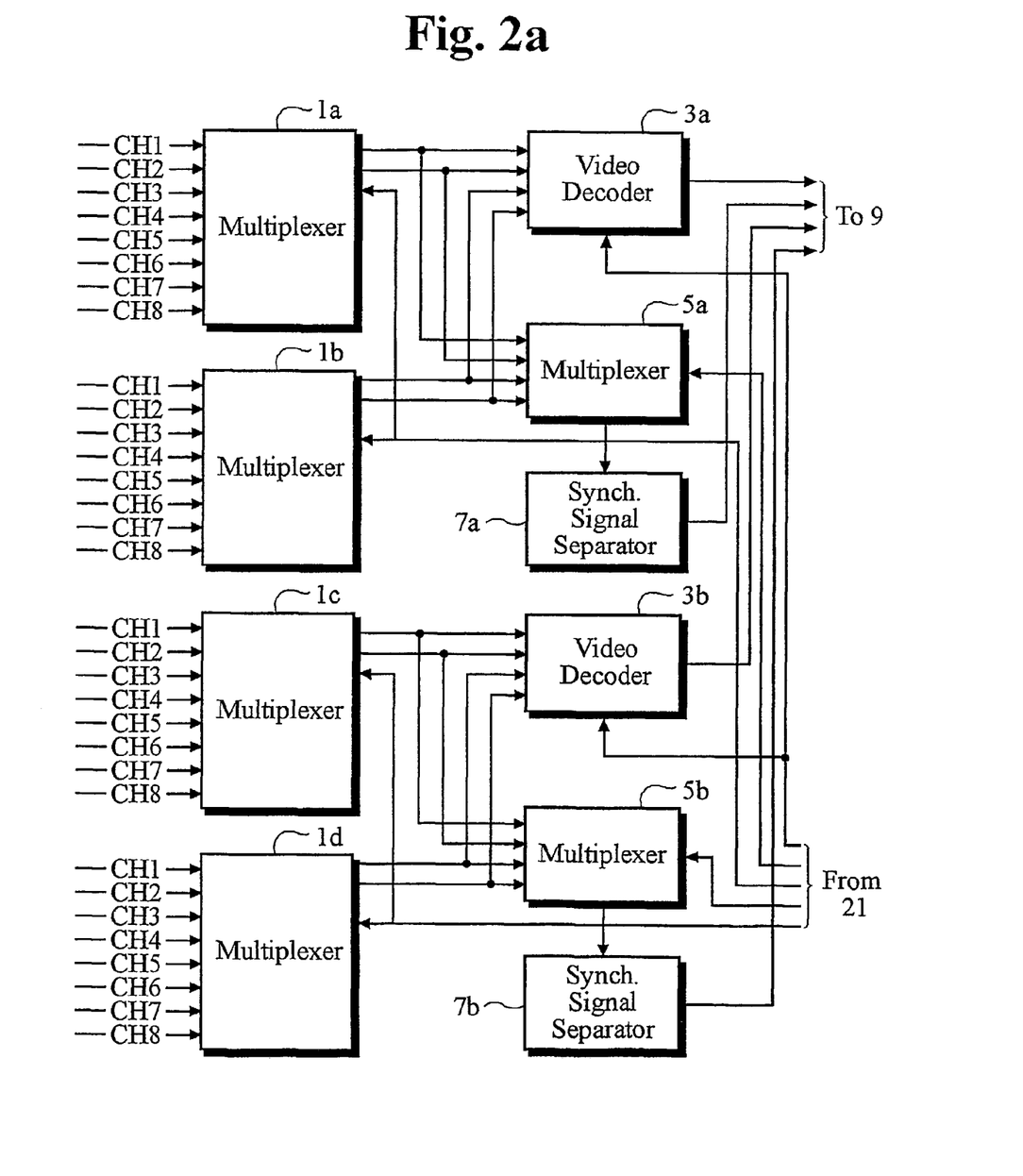
FIGS. 2a and 2b are a block diagram of an exemplary design of a multi-channel MPEG encoding system in accordance with one embodiment of the present invention.
Figure 2B:
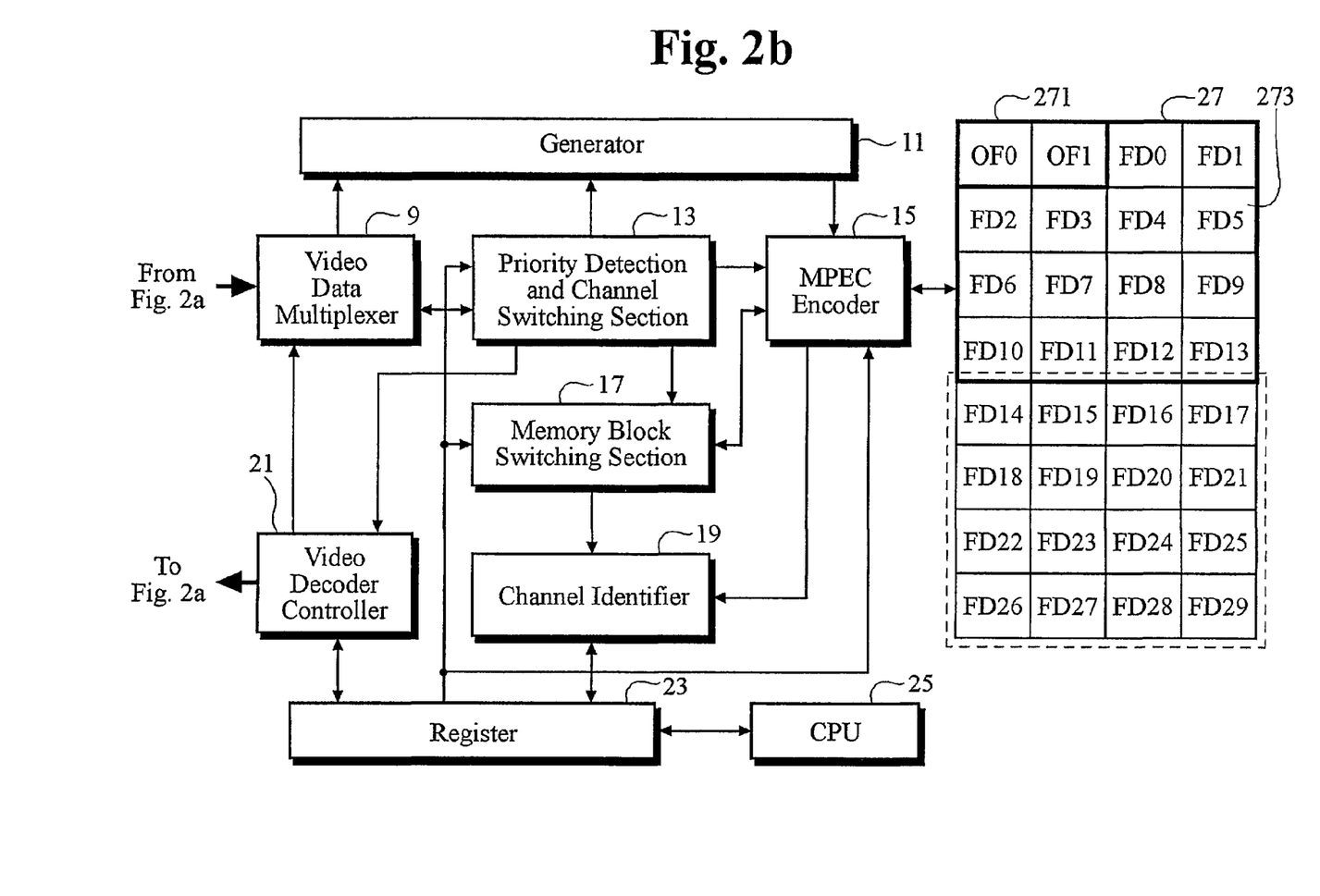

FIGS. 2a and 2b show one embodiment of a multi-channel MPEG encoding system in accordance with the present invention. Though the MPEG encoding system is shown to receive video signals from 16 channels, this system can be expanded to accommodate any number of input video channels.

One of the video signals input to the MPEG encoding system is selected through a combination of a multiplexer 1, a video decoder 5 and a video data multiplexer 7. Memory block switching is mainly performed in a memory block switching section 17. It will be apparent to those who skilled in the art that varied, modified and altered structure of selecting means, for example, other combination and/or other number of selecting elements, are possible.

Each of four 8×2 multiplexers 1a–1d selects two analog video signals from eight input video signals. Four video signals selected by multiplexers 1a and 1b are communicated to a video decoder 3a, and another four analog video signals selected by multiplexers 1c and 1d are communicated to another video decoder 3b. The video decoders translate analog video signals received from the multiplexers into digital video signals so that an MPEG encoder 15 can interpret the video signals. The video decoders understand both NTSC and PAL signals, and generate CCIR601 16 bit digital video data. Let's assume that the video signals are composite NTSC signals. CCIR601 video data includes frame, line and field synchronization signals, and information about brightness (Y) and color difference (UV). Some video decoder can scale input video signals to a different size.

Two video decoders are used in this embodiment because it contributes to stabilizing an encoded frame rate. In fact, the more video decoders are used, the more stabilized the encoded frame rate becomes. However, since a non-real time system like this embodiment does not require a high frame rate, it is preferred to use an appropriate number of video decoders to optimize the requirement of encoding system. The video decoders 3*a* and 3*b* independently generate digital video signals, which are subsequently communicated to a video data multiplexer 9. The video data multiplexer 9 selects one of two digital video signals received from the two video decoders.

The multiplexer, video decoder and video data multiplexer that participate in selecting one of 16 input channels are all controlled by a video decoder controller 21. The video decoder controller determines an input video signal to be selected, by referring to input channel information supplied by a register 23, and a priority detection/channel switching section 13. Generating a control signal for channel selection will be explained in detail in later along with an explanation of how a stabilized frame rate is achieved.

The selected digital video signal is written in the memory 27 for use in MPEG encoding. For video signals each consisting of an even field and odd field, only one type of field may be used in MPEG encoding. In that case, the size of a memory block can be that of one field data. In other words, though one frame of video signals is received, only one field data in the frame may be written in the memory. An MPEG encoder 15 encodes digital video signals stored in the memory 27 into MPEG signals. VICA 1000™ of 4NSYS Inc. or its equivalent may be used as the MPEG encoder. VICA 1000™ can encode CCIR601 digital video signals into MPEG signals. The size of digital video signals that can be encoded into MPEG signals is 352×230 for MPEG 1 and 352×480 for MPEG 2.

A synchronization signal generator 11 generates data synchronization signals that are to be input to the MPEG encoder. It generates synchronization signals from input video signals.

As described before, digital video signals from the input channels are first stored in the memory 27, and subsequently read from the memory and/or copied in other location of the memory during an encoding process. Therefore, MPEG encoded frames of one channel would be mixed with those from other input channels as they stream out of the MPEG encoder. Therefore, it is necessary to identify the input channels of the MPEG encoded frames so that mixed MPEG encoded frames can be separately decoded by a conventional MPEG decoder (not shown in FIGS. 2*a* and 2*b*). A channel identifier 19 plays the role of inserting channel IDs into the encoded MPEG frames. It receives information about the input channel whose video signals are currently encoded by the MPEG encoder 15 from the register and, based upon this information, inserts a channel identifier after the picture start code in each of encoded MPEG frames.

A CPU 25 initializes a register 23. When the CPU receives interrupt signals from the channel switching section and the channel identifier, it writes, if necessary, information into the register. After receiving interrupt signals from the channel switching section 13, the CPU writes the current input channel information and encoding mode, i.e., generation mode of P-frame or I-frame. After receiving interrupt signals from the channel identifier 19, CPU 25 writes the current input channel information and synchronization information.

In accordance with the present invention, the memory block switching section 17 determines a memory block for reading and writing. It receives information from the register 23 about the number of maximally encodable input channels, MPEG mode and current input channel. Based upon this information, it outputs an address needed for selecting a memory block. The memory 27 is divided into blocks each for storing one field of data in a format the MPEG encoder 15 can interpret. The memory blocks are uniquely identified by the high bits of address generated by the block switching section 17.

Referring to FIGS. 2*a* and 2*b*, the number of memory blocks is 16 if the multi-channel MPEG encoding system simultaneously supports 13 input channels (it is possible to support up to 29 channels if the memory blocks within dotted lines are used together). Two memory blocks OF are used as an input frame memory for storing input frames and Fourteen memory blocks FD are used as a restoring frame memory for storing restoring frames. However, it would be apparent to those who skilled in the art that other kinds of addressing methods are possible.

Now referring to FIGS. 3 and 4, memory block switching by the memory block switching section 17 will be described in detail.

Figure 3:
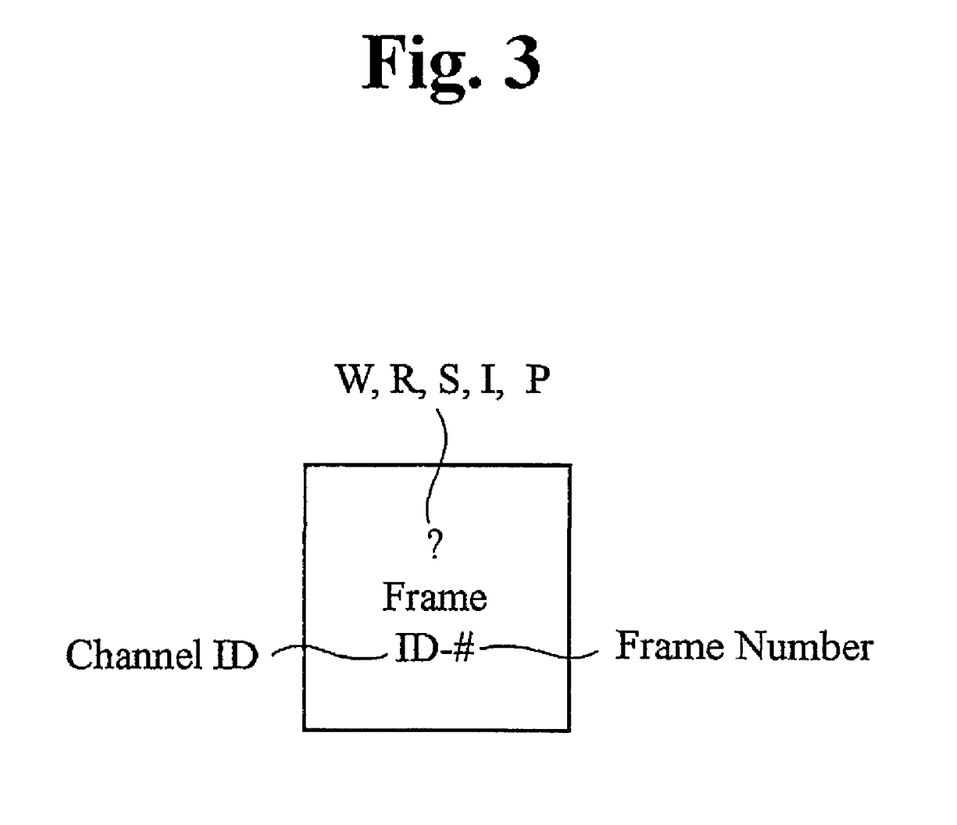
FIG. 3 is schematic diagram showing the meaning of reference signs for identifying memory block.

FIG. 3 shows reference numerals to identify the frame status. The reference numerals written in the upper part of the frame are W, R, S, P, I. "W" indicates a frame that is being written into a memory block. "R" indicates a frame that is being read from a memory block. "S" indicates a frame that has been stored in a memory block. "P" indicates a frame that is an MPEG encoded P-frame. And "I" indicates a frame that is an MPEG encoded I-frame. The reference numerals written in the lower parts of the frames are channel identifiers and frame numbers. For instance, if the frame is a second frame in channel A, then "A-2" is written into the lower part of the frame.

Figure 4A:
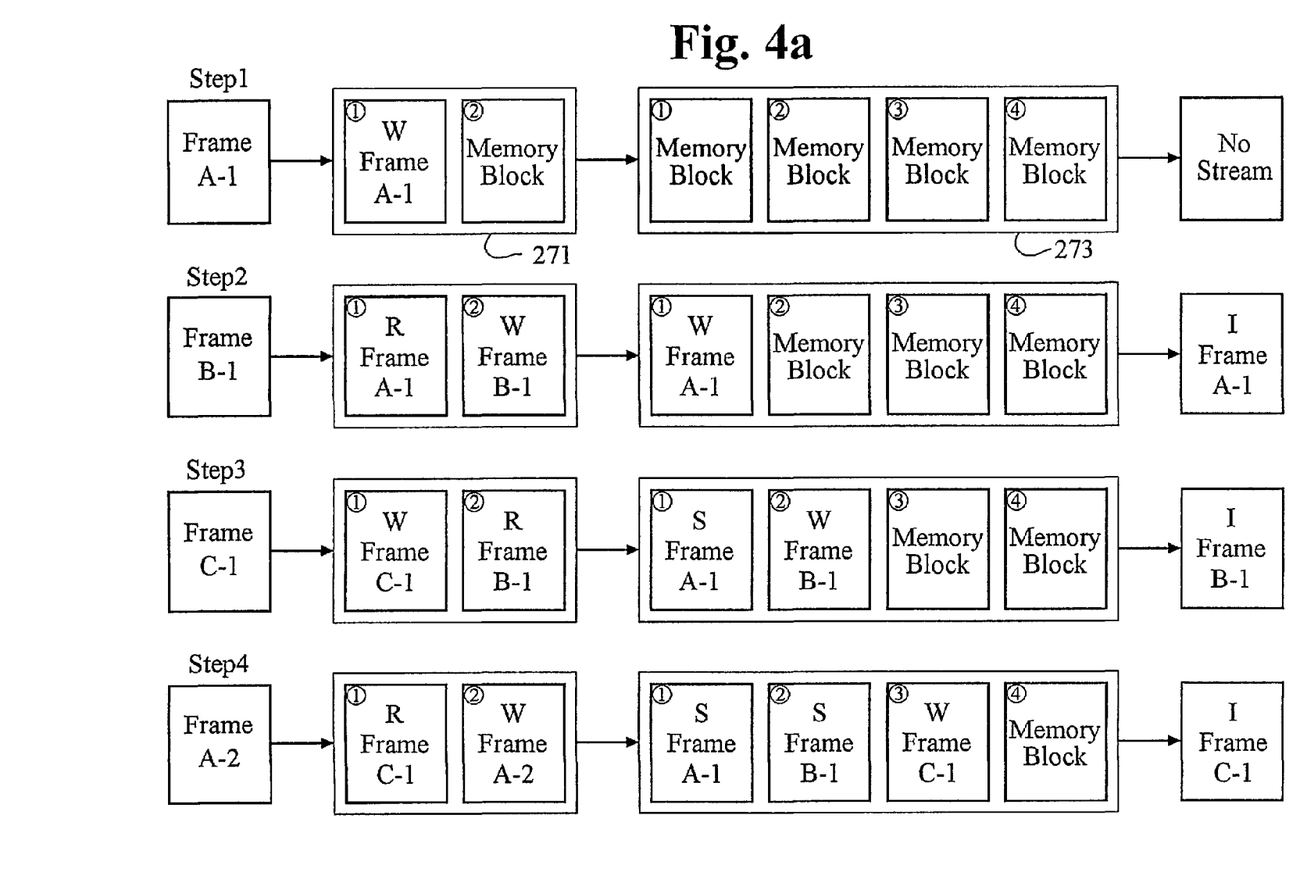
FIGS. 4a and 4b are a schematic diagram showing exemplary method of memory block switching when input video channels are 3, in accordance with one embodiment of the present invention.
Figure 4B:
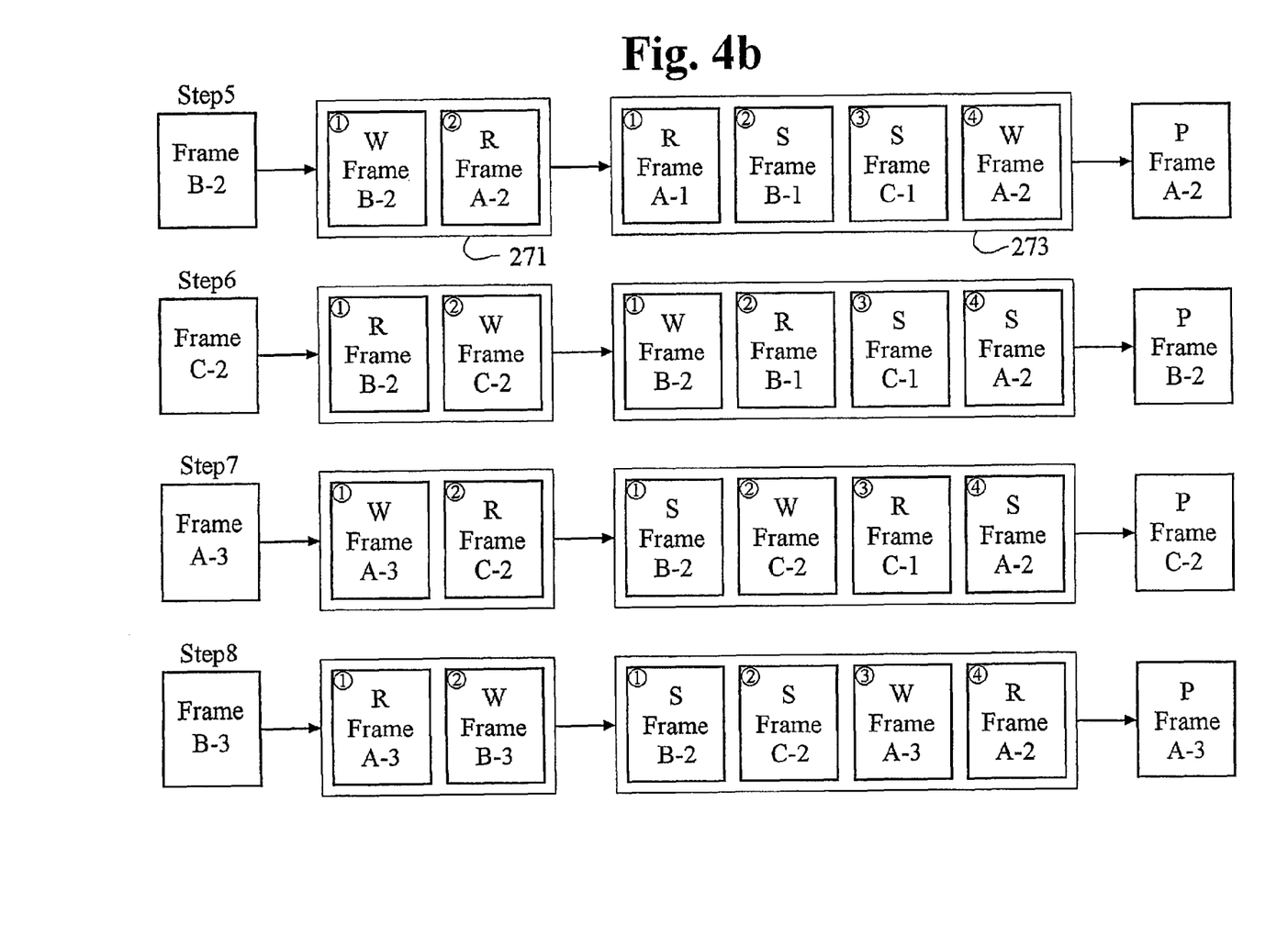

FIGS. 4*a* and 4*b* illustrate a series of encoding steps using an exemplary method of using common memory blocks for storing frames from a plurality of video channels in accordance with the present invention. Frames shown in FIGS. 4*a* and 4*b* are labeled in accordance with the rule of reference numerals as defined above. The memory block usage method depicted in FIGS. 4*a* and 4*b* can also be applied in a case where a different number of input channels are used.

An input frame memory 271 consists of two memory blocks without regard to the number of input channels. The number of memory blocks in the restoring memory 273, however, depends upon the number of input channels. In order to store one cycle of video frames from N input channels at least N+1 memory blocks are needed. In the exemplary embodiment shown in FIGS. 4*a* and 4*b*, the restoring memory block 273 consists of 4 memory blocks, which are minimally needed for storing the restoring frames of 3 input channels. Specifically, the three input channels are identified as A, B and C. The figure illustrates what frames have been written to or read from each memory block right before B-3 frame is input. At the first step, frame A-1 is input and written in the first block of an input frame memory 271. At the second step, frame B-1 is input and written in the second block of the input frame memory. At the same time, frame A-1 that was stored in the input frame memory is read and encoded into a MPEG frame. Since frame A-1 is the first input frame, the encoded frame is an I-frame. Then, frame A-1 is written in the first block of a restoring frame memory 273 so that it will be later used to remove the temporal redundancy of frame A-2. At the third and fourth steps, frames C-1 and A-2 are sequentially input respectively and the same encoding function as that of the second step is repeated. As a result, I-frames for input frames B-1 and C-1 are generated and frames B-1 and C-1 are respectively written in the restoring frame memory. During this process, two memory blocks of the input frame memory are used alternatively and sequentially to write input frames. And frame C-1 and frame A-2 are written respectively in the first and second blocks of the input frame memory. In this way, in encoding frames from multiple input channels a same input frame memory is commonly used.

At the fifth step, when frame B-2 is input, it is written in the first block of the input frame memory and frame A-2 stored in the second block of the input frame memory is read for MPEG encoding. P-frame for frame A-2 is generated using frame A-1 at this step. To do so, frame A-2 stored in the input frame memory and frame A-1 stored in the restoring frame memory are read to encode frame A-2 into a P-frame. Concurrently, frame A-2 is written in the fourth block of the restoring frame memory for later encoding A-3 frame into a P-frame.

At the sixth step, when frame C-2 is input, frame B-2 is encoded in the same manner that frame A-2 was encoded at the fifth step. As a result, a P-frame for frame B-2 is generated and frame B-2 itself is written in the restoring frame memory. Since frame A-1 is no longer needed, frame B-2 is overwritten in the first block where frame A-1 has been stored. At the seventh step, frame A-3 is input and the same encoding function is repeated. In this manner, the restoring frame memory can be used to store the restoring frames of input frames, needed to MPEG encode the input frames.

As explained above, only two memory blocks are needed for an input frame memory while and memory blocks just one more than the number of input channels are required for a restoring frame memory, according to the present invention. Reading and writing are alternatively performed in each of the two memory blocks of the input frame memory and, considering reading and writing of input frame in the input frame memory as one function, two memory blocks are alternatively used. Likewise, reading and writing are alternatively performed in each of the memory blocks of the restoring frame memory 273 and the writing and reading of restoring frames are sequentially and alternatively performed at the memory blocks in the order of memory blocks 1-2-3-4-1-2-3-4 . . . . During these repeated reading and writing steps in the restoring frame memory, a restoring frame newly input to the restoring frame memory is written in the memory block where the previous restoring frame was stored. (for example, at the fifth step in FIG. 4b, after frame A-1 was read for MPEG encoding, frame B-2 is written in the first memory block where frame A-1 was stored).

Figure 5:
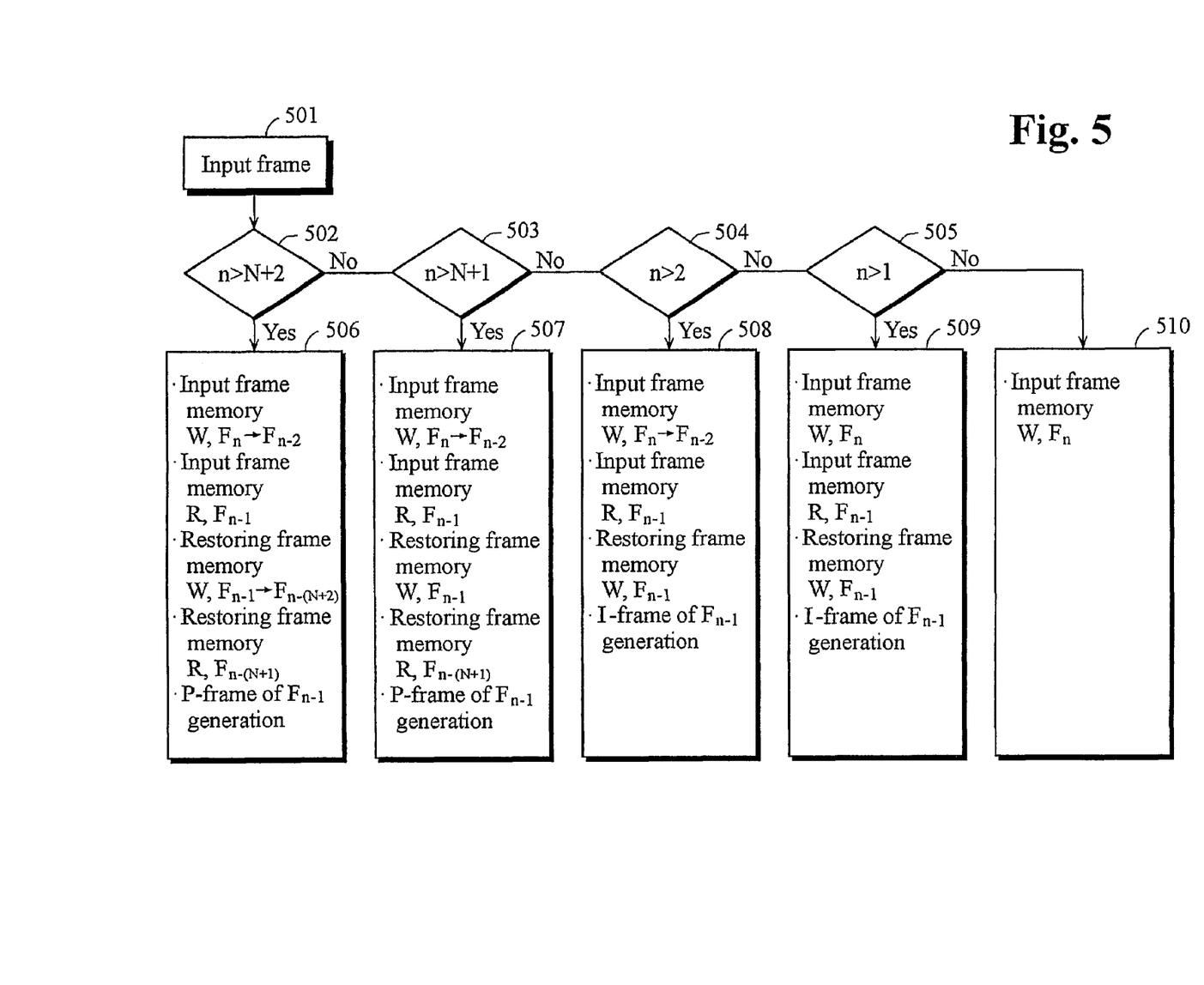
FIG. 5 is a flow chart illustrating general method of memory block switching in accordance with one embodiment of the present invention.

FIG. 5 shows a generalized embodiment of the present invention where the number of input channels are N (an integer) and, thus, the number of memory blocks in the restoring frame memory is, N+1. Specifically "N" represents the number of input channels, "n" represents the input sequence, "W" represents a writing operation in memory block, "R" represents a reading operation from memory block and "$F_n$" represents the $n^{th}$ input frame. Therefore, for example, W $F_n \rightarrow F_{n-2}$ means writing the $n^{th}$ input frame in the memory block where the $(n-2)^{th}$ input frame was stored.

When frames are input at the step 501, memory writing/reading operations are determined according to the input sequence of frames. The input sequence of frames is determined at sequence determining steps 502, 503, 504, 505.

If an input sequence is determined to be greater than N+2 at step 502, the following memory switching function is performed at step 506. This step corresponds to a series of steps after step 6 shown in FIG. 4b. First, the current $n^{th}$ input frame is written in the memory block of the input frame memory 271 where the $(n-2)^{th}$ frame was stored. And then, the $(n-1)^{th}$ input frame is read from the memory block of the input frame memory. The $[n-(N+1)]^{th}$ restoring frame is read from the memory block of the restoring frame memory 273. Finally, P-frame for n-$1^{th}$ input frame is generated using the $[n-(N+1)]^{th}$ restoring frame and the n-$1^{th}$ input frame. The n-$1^{th}$ restoring frame is written in the memory block of the restoring frame memory 273 where $[n-(N+2)]^{th}$ restoring frame was stored.

If an input sequence is determined to be N+2 at step 503, the following memory switching function is performed at step 507. This step corresponds to the fifth step in FIG. 5. The memory switching function performed at this step 507 is the same as that of the step 506, with an exception that the $(n-1)^{th}$ restoring frame is written in the empty memory block of the restoring frame memory 273. Since there is still empty blocks in the restoring frame memory 273, the $(n-1)^{th}$ restoring frame is written in one of the empty memory blocks.

If an input sequence is determined to be greater than 2 but less than N+2 at the step 504, the following memory switching function is performed at the step 508. This steps corresponds to the third and fifth steps in FIG. 4a. At this step 508, since there is no previous input frame for eliminating temporal redundancy of the $(n-1)^{th}$ input frame, there is no step of reading a restoring frame from the restoring frame memory 273 and, therefore, not P-frame but I-frame is generated at this step 504. Other functions are the same as those of the step 507.

If an input sequence is determined to be 2 mat step 505, the following memory switching function is performed at step 509. This step corresponds to the second step of FIG. 4a. Since there is an empty memory block in the input frame memory 271, the input frame is written in the empty memory block. Other functions are the same as those of the step 508.

If the input frame is the first frame, then it is written in one of the two empty memory blocks of the input frame memory 271 at step 510.

As explained above, FIG. 5 illustrates the method of memory block sharing when video signals are received from all of the maximally supportable number of input channels (that is, N input channels if there are N+1 memory blocks in the restoring frame memory 273) and frame rate control for each of input channels is not performed. In the case that the number of input channels is less than that of the maximally supportable channels (that is, more than N+1 memory blocks in the restoring frame memory 273 when there are N input channels), there is no change in input frame memory sharing manner, but there is a slight change in the restoring frame memory sharing scheme.

Specifically a change is made to step 506 of FIG. 5, which is taken when an input sequence of frame is greater than N+2. Since input channels are less than maximally supportable channels, an empty memory block might be still available in the restoring frame memory 273 at step 506 of FIG. 5 and, therefore, a restoring frame might be written in the empty memory block. Consequently, in this case, the memory block switching at step 506 of FIG. 5 performs W $F_{n-1}$ rather than W $F_{n-1} \rightarrow F_{n-(N+2)}$. Using more memory blocks than required for maximally supportable channels reduces system complexities, thus lessening the burden on a MPEG encoding system.

MPEG encoded frames generated by the memory switching method in accordance with one embodiment of the present invention do not have a conventional MPEG frame structure since video signals from multiple input channels are mixed in a MPEG frame stream. For example, the MPEG encoding system, shown in FIG. 3, where there are three input channels A, B, and C, generates MPEG encoded frames in the order of $I_{A-1}$, $I_{B-1}$, $I_{C-1}$, $P_{A-2}$, $P_{B-2}$, $P_{C-2}$ . . . . These frames can not be decoded by a conventional MPEG decoder. Therefore, it is necessary to sort the mixed MPEG encoded frames into each of the input channels before they can be decoded by conventional MPEG decoders.

Figure 6:
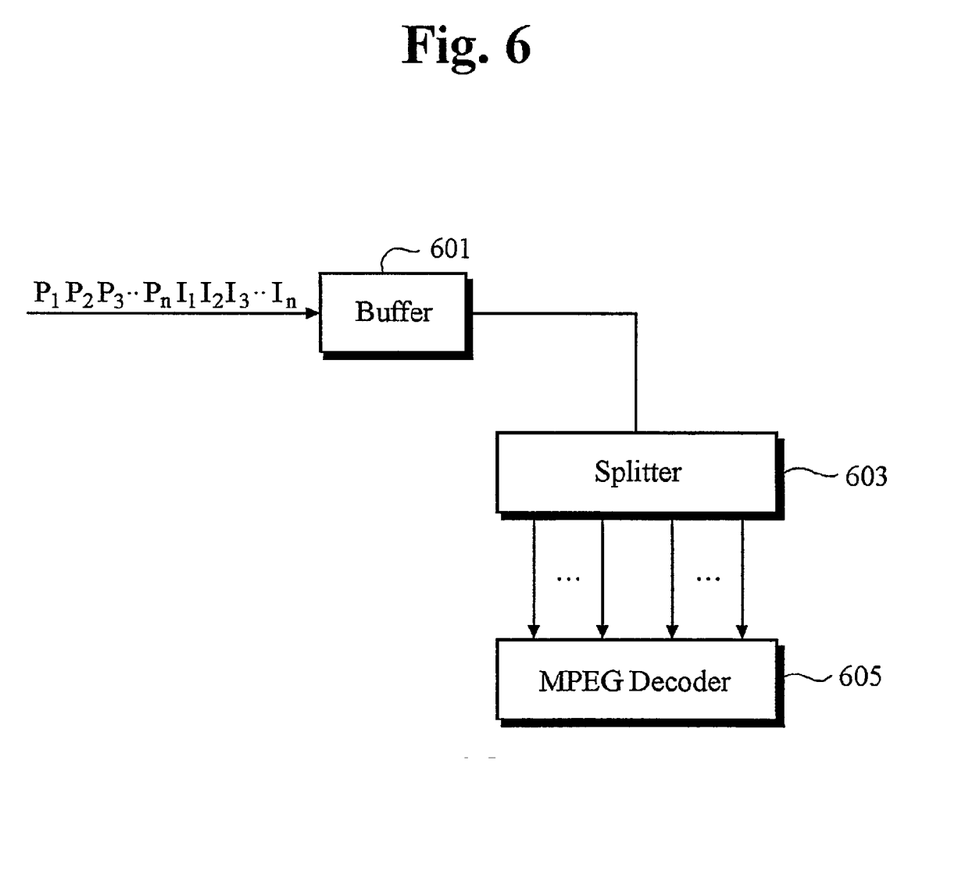
FIG. 6 is a schematic block diagram of a splitter in accordance with one embodiment of the present invention for splitting MPEG coded frames into each of input channels in accordance with one embodiment of the present invention.

FIG. 6 shows a splitter 603 that splits the mixed MPEG encoded frames into each of input channels, as follows. First, mixed MPEG encoded frames are temporarily stored in a buffer 601. As mentioned before, since the channel identifier 19 would have inserted channel IDs into the MPEG construction, the splitter 603 extracts these inserted channel IDs to divide MPEG encoded frames into each of the input channels. The divided MPEG frames are then decoded by a conventional MPEG decoder 605.

Now, returning to FIGS. 2a and 2b, another feature of the present invention that stabilizes the frame rate of MPEG encoding will be described. As mentioned before, the frame rate of MPEG encoding fluctuates with a change in the number of input channels and in time. In accordance with one embodiment of the present invention, frame rate fluctuation is solved by arranging input channels according to channel priorities.

The input channel priorities, that are an input sequence of frames into MPEG encoder 15, are determined by the priority detection and channel switching section 13 and the synchronization signal separator 7.

The priority detector 13 monitors the synchronization signals of input channels generated by the synchronization signal separator 7 from analog video signals in order to determine channel priorities. The synchronization signals of input channels can also be detected from the output signals of the video decoder 3. However, since the separator 7 separates the synchronization signals directly from the analog video signals, the priority detector 13 can detect the synchronization signals before the video decoder 3 generates the synchronization signals from each of input channels.

Once channel priorities are determined by the priority detector 13 the channel switching section 13 communicates the determined priorities to the video data multiplexer 9 and the video decoder 3. In response, the video data multiplexer and video decoder select one of input channels according to the received channel priorities.

Figure 7:
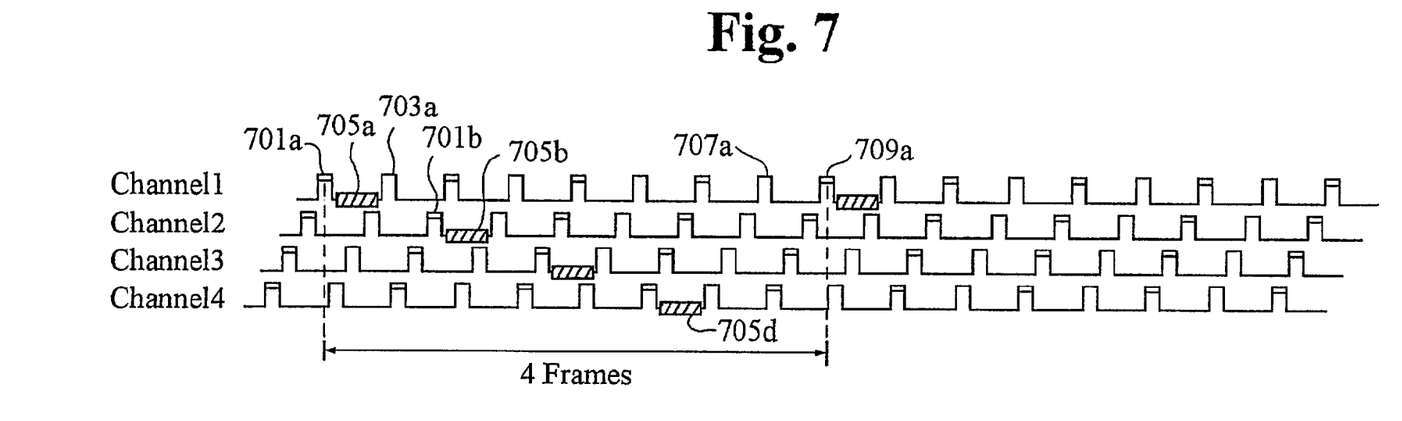
FIG. 7 is a schematic diagram showing phase relationship among non-arranged synchronization signals of 4 input channels.
Figure 8:
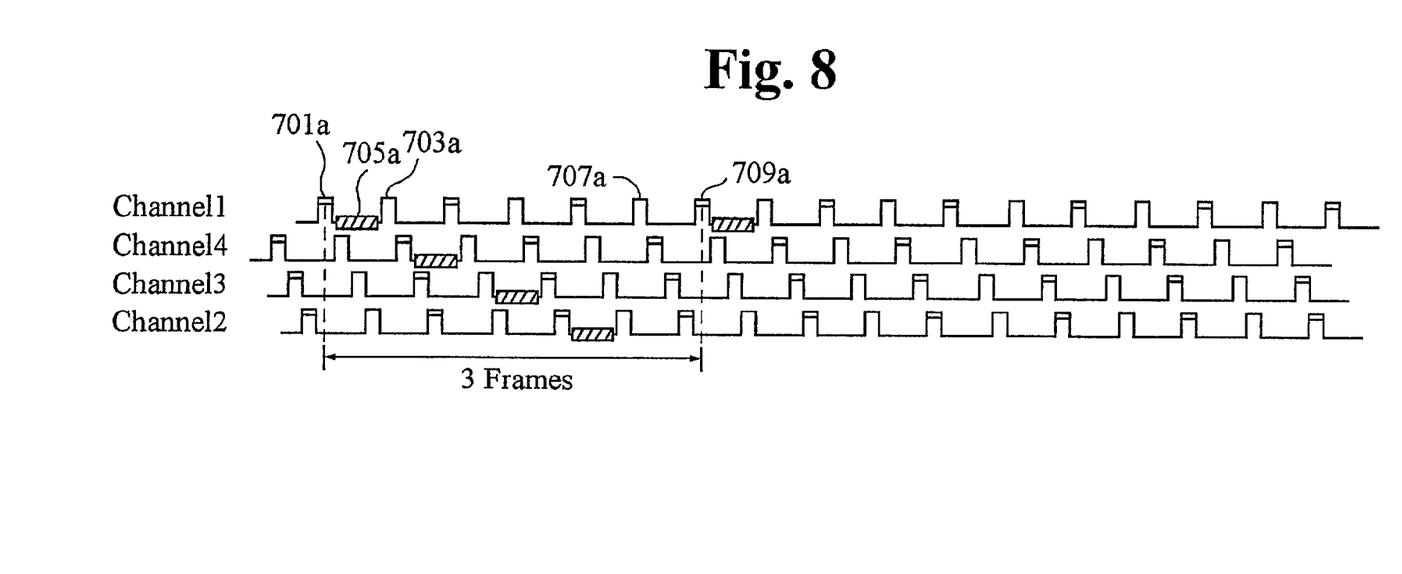
FIG. 8 is a schematic diagram showing phase relationship after arranging synchronization signals of FIG. 7 in accordance with one embodiment of the present invention.
Figure 9:
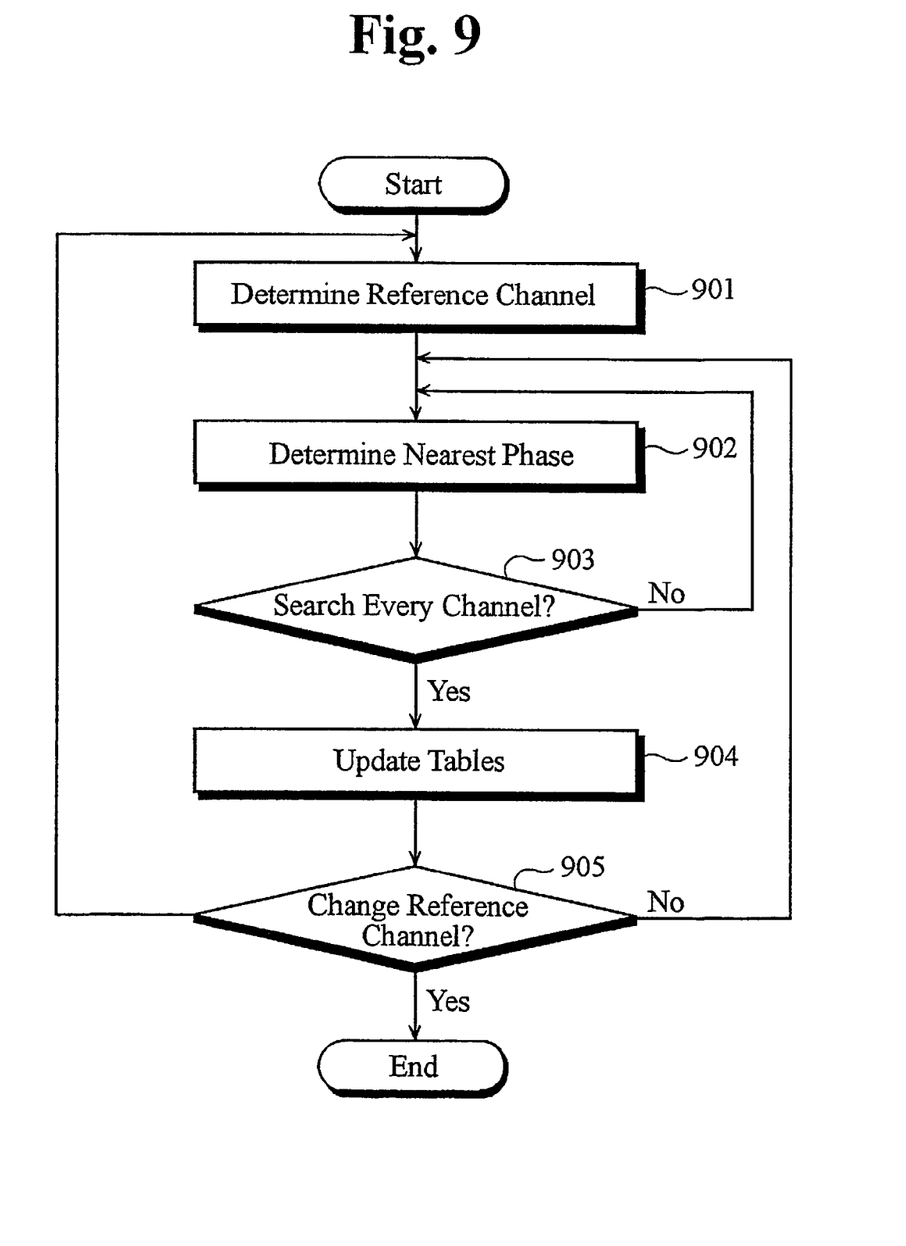
FIG. 9 is a flow chart illustrating the method of arranging input channels in accordance with one embodiment of the present invention.

Referring to FIGS. 7–9 are explained the detailed method for determining channel priorities.

FIG. 7 shows the synchronization signals of four input channels, whose priorities will be determined by the synchronization signal separator 3. FIG. 7 shows synchronization signals of four input video signals. The video decoder 3 will select one of the four input video signals based on priorities of the input video signals. As mentioned above, the video decoder 3 receives channel priorities that were determined by the channel switching section 13 before selecting one of the four input video signals.

In case that synchronization signals consists of odd field synchronization signals 701 and even-field synchronization signals 703, that alternate. These even/odd field synchronization signals are found in video signals having even and odd fields, such as in signals for an interlacing display device. Between any two synchronization signals data of a video signal is transmitted. According to the present invention only one of the two frame types may be used, provided that it is consistently used throughout the encoding. That is, if the first input frame to MPEG encoder 15 was that of an odd field, then the subsequent input fields should be odd. Encoding odd and even fields alternately causes discontinuities in regenerated images. In FIG. 7, only the odd fields of input video data are represented by dashed lines.

As shown in FIG. 7, if input channels were encoded without adjusting their order, it would take time that amounts to four frames to encoded frames of video signal, i.e., one from each channel. After the first field of the first channel 705a is MPEG encoded and, then a synchronization signal that is nearest to the end of the first field data of the first channel is searched for to determine a second channel. A channel synchronization signal nearest to the phase of the first channel synchronization signal is an odd field synchronization signal 701b. Then an odd field 705b of this channel is encoded. The above steps are repeated for determining third and fourth channels. After encoding fourth channel field data 705d, a channel synchronization signal that is nearest to the phase of the fourth channel synchronization signal is again searched for. Though the nearest synchronization signal is that of an even field 707a of the first channel, an odd field synchronization signal 709a is detected since the first channel started encoding odd field data. In consequence, it takes time equivalent to four frames (corresponds to eight field synchronization signals) to MPEG encode one field data of all input channels.

As shown in FIG. 7, in encoding multi-channel video signals without channel reordering the encoding time will be determined by the phase relationship between the synchronization signals of input channels. Therefore, changing the input channel sequence causes frame rate fluctuation. Moreover, because the periods of the synchronization signals of input channels are not identical and change slowly as time goes by, the frame rate also changes in time. The extent of frame rate fluctuation becomes large as the number of input channels increases because phase differences among input channels would be greater. Given that there are n input channels, the encoding time might vary as much as by n/2 frame in encoding frames of all the input channels one cycle, i.e., one frame for each channel.

The problem of frame rate fluctuation is solved by arranging input channels in a manner according to the present invention. FIG. 8 shows the phase relationship of the synchronization signals after input channels shown in FIG. 7 were arranged according to the present invention. The arranging method is as follows.

Any one of the input channels is set as the reference channel. One of the remaining input channels is searched for whose phase of synchronization signal is nearest to that of the reference channel and is made the second channel. The third and fourth channels are determined in the same manner. This newly determined order become channel priorities for all the input channels. Referring to FIG. 8, this arranging method is explained in detail.

First, let the first input channel be the reference channel. In fact, the reference channel may be randomly selected from input channels. Then, by comparing the phases of the synchronization signals of the remaining channels with that of the reference channel, a channel having the synchronization signal whose phase is nearest to that of the reference channel is set as the second input channel. In the example, the originally fourth channel is found to have the nearest phase and, thus, is set as the second input channel. Then, repeating these steps to the remaining channels now with this new second input channel set as the reference channel, the channel priorities of all the input channels are determined. The resulting new input sequence is channel 1, channel 4, channel 3 and channel 2 in the example. As shown in FIG. 8, all the channels but channel 3 use odd field data for MPEG encoding. After encoding the field data of channel 2, the field data of channel 1 is encoded again. Although the synchronization signal of channel 1 nearest to that of channel 2 is even field synchronization signal 707a, odd field synchronization signal 709a is detected since channel 1 started encoding odd field data 703a.

With the above-described encoding method an encoding time for encoding one field data of each channel would amount to a time period spanning only three frames as opposed to 4 frames with conventional encoding methods. As mentioned before, the phase relationship of the synchronization signals of input channels varies with time. Therefore, it is necessary to check whether the determined channel priorities properly represent the current phase relationship of the synchronization signals. In accordance with the present invention, an original input channel sequence is rearranged depending on the variation of the phases of synchronization signals.

In one embodiment of the present invention, channel priorities are continuously detected during the MPEG encoding process. But instead of being used immediately, continuously detected channel priorities are first written into a channel priority table. The channel priority table does not have to be updated in every encoding cycle. Since the changing rate of the synchronization signals is much lower than the frame rate of input channels, it is preferred to update the channel priority table in a longer period than what it takes to encode frames of all input channels, one each. In one embodiment of the present invention, the channel priority table may be disposed in a register 23 or in the priority detection and channel switching section 13. The video decoder controller 21 reads an input channel sequence stored in the channel priority table and generates control signals for selecting one of the input channels in an order dictated by the priorities (referring to FIGS. 2a and 2b).

FIG. 9 illustrates the method of arranging input channels in accordance with the present invention. At step 901, one of input channels is set as the reference channel. Though the initial frame rate might depend upon which of the input channels was selected as the reference channel, a same frame rate will eventually be arrived at regardless which channel was first selected. Supposed that channel 1 is set as the reference channel in the example. At step 902 a channel whose synchronization signal is nearest to the end of the input field data of the reference channel is searched for. Thus-found channel becomes the second input channel.

At step 903, it is determined whether every input channel has been assigned a priority or an input sequence. If not, steps 902 and 903 are repeated and 903 until every input channel is assigned a priority. If every input channel is assigned a priority, the channel arranging process is terminated. At step 904, channel priorities are written into the channel priority channel. Then, at step 905 it is determined whether the reference channel needs to be changed. For example, if the camera for the current reference channel malfunctions or the reference channel is eliminated from MPEG encoding, it is necessary to decide a new reference channel. If so, step 901 is repeated to set a reference channel. Subsequently steps 902–905 are performed. If not, step 902 and subsequently steps 903–905 are performed to determine a nearest phase channel.

While the present invention has been described in conjunction with specific embodiments thereof, it is evident that many alternations, modifications, and variations will be apparent to those who skilled in the art in light of the foregoing description. For example, the present invention has been described in multi-channel MPEG encoding system, the technical feature of the present invention that multiple input channels share hardware resources and encoded frame rate is stabilized is apparently to be applied under the multi-channel encoding systems that do not adopt MPEG. Accordingly, it is intended to embrace all such alternations, modifications, and variations in the appended claims.

What is claimed is:

1. A multi-channel encoding system for encoding video signals from a plurality of input channels, each video signal being composed of a multiple of image data frames, comprising:
   a means for selecting one channel from said plurality of input channels; and
   a means for storing image data frames, comprising a first set of at least two memory blocks for storing input image frames and a second set of memory blocks for storing restoring image frames, the number of memory blocks in the second set being one more than the number of said input channels,
   wherein said first set of memory blocks alternately store successively-received input image frames such that at least one non-storing memory block can be read and said second set of memory blocks alternately store successively-received restoring image frames such that at least one non-storing memory block can be read.

2. The multi-channel encoding system of claim 1, wherein said selecting means comprises at least one multiplexer, video decoder, and video decoder multiplexer.

3. The multi-channel encoding system of claim 1, wherein said video signals are MPEG encoded.

4. The multi-channel encoding system of claim 1, further comprising a means for inserting channel identifiers in encoded image data frames.

5. A method for selecting memory blocks, in a multi-channel MPEG encoding system for encoding video signals from N input channels having a set of input frame memory blocks and a second set of restoring-frame memory blocks the number of the memory blocks in the second set being at least (N+1) comprising the steps of:
   (a) selecting one channel from said plurality of input channels; and
   (b) alternately storing successively-received image data frames in a first set of at least two memory blocks such that at least one non-storing memory block can be read and alternately storing restoring image data frames in a second set of memory blocks such that at least one non-storing storing memory block can be read.

* * * * *